United States Patent
Hosotani

(10) Patent No.: US 9,601,996 B2
(45) Date of Patent: Mar. 21, 2017

(54) SWITCHING POWER SUPPLY APPARATUS

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 360 days.

(21) Appl. No.: 13/851,119

(22) Filed: Mar. 27, 2013

(65) Prior Publication Data
US 2013/0257393 A1  Oct. 3, 2013

(30) Foreign Application Priority Data

Mar. 28, 2012  (JP) .................................. 2012-073408

(51) Int. Cl.
*H02M 3/155* (2006.01)
*H02M 3/156* (2006.01)

(52) U.S. Cl.
CPC ........... *H02M 3/155* (2013.01); *H02M 3/156* (2013.01)

(58) Field of Classification Search
CPC .... H02M 3/1588; H02M 3/155; H02M 1/155; H02M 1/156; H02M 3/156
USPC .................. 323/222, 225, 268, 271
See application file for complete search history.

(56) References Cited

U.S. PATENT DOCUMENTS

| | | | |
|---|---|---|---|
| 4,903,189 A * | 2/1990 | Ngo et al. ..................... 363/127 |
| 5,550,458 A | 8/1996 | Farrington et al. |
| 5,835,369 A * | 11/1998 | Bottrill ............... H02M 1/4266 363/126 |
| 6,434,029 B1 * | 8/2002 | Cyr et al. ......................... 363/86 |
| 2004/0079953 A1 * | 4/2004 | Mednik et al. ................. 257/82 |
| 2005/0281059 A1 * | 12/2005 | Yasumura ........... H02M 1/4241 363/16 |
| 2008/0169792 A1 | 7/2008 | Orr |
| 2009/0267576 A1 * | 10/2009 | Orr ................. 323/259 |
| 2010/0237843 A1 * | 9/2010 | Rivet et al. ................... 323/282 |
| 2010/0253312 A1 * | 10/2010 | Morimoto ..................... 323/312 |
| 2011/0316090 A1 * | 12/2011 | Chang et al. ................. 257/379 |

FOREIGN PATENT DOCUMENTS

| | | |
|---|---|---|
| CN | 1567670 A | 1/2005 |
| CN | 101578756 A | 11/2009 |
| JP | 61-280769 A | 12/1986 |
| JP | 07-337000 A | 12/1995 |

OTHER PUBLICATIONS

Official Communication issued in corresponding Chinese Patent Application No. 2013100936074, mailed on Aug. 5, 2015.

* cited by examiner

*Primary Examiner* — Matthew Nguyen
*Assistant Examiner* — Trinh Dang
(74) *Attorney, Agent, or Firm* — Keating & Bennett, LLP

(57) ABSTRACT

In a switching power supply apparatus, a switching element is turned on/off to intermittently conduct current input via an inductor. Current input during a period in which the switching element is turned off is supplied to an electrolytic capacitor via a conduction path. A rectifier diode is provided in the conduction path to face toward the electrolytic capacitor. An inductor is provided in the conduction path to be connected in series with the rectifier diode. A high speed diode has a reverse recovery time shorter than the reverse recovery time of the rectifier diode, and is connected in parallel with the inductor to face toward the electrolytic capacitor.

14 Claims, 7 Drawing Sheets

FIG. 4A  TIME t1 TO TIME t2
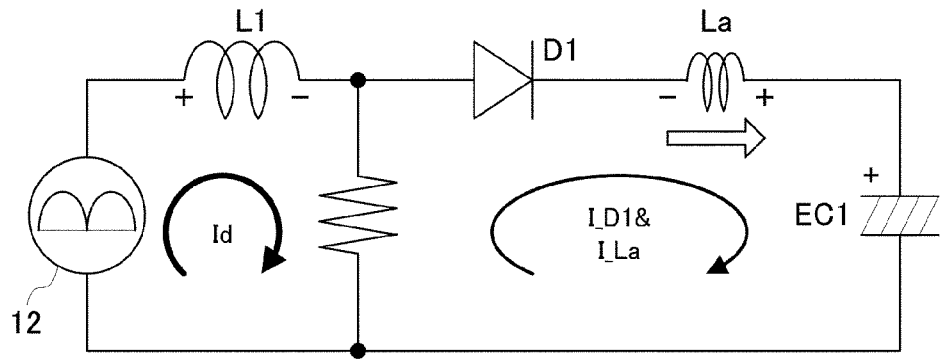
FIG. 4B  TIME t2 TO TIME t3
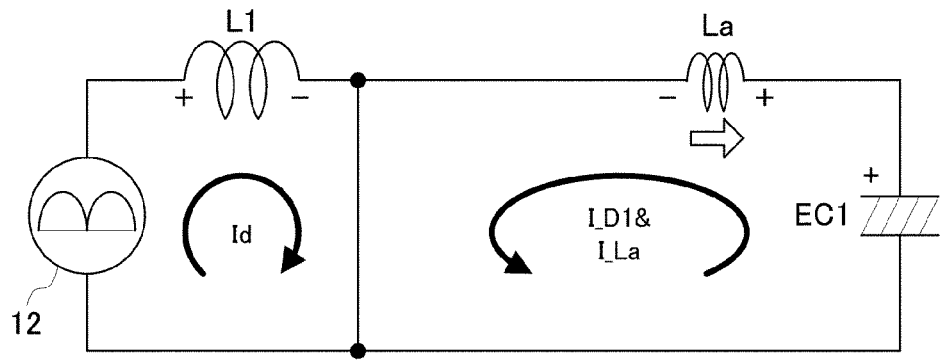
FIG. 4C  TIME t3 TO TIME t4
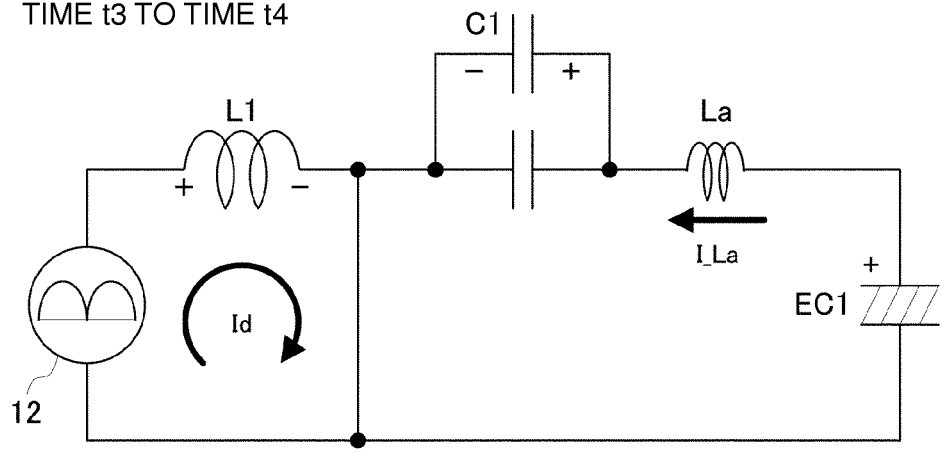

FIG. 5A  TIME t4 TO TIME t5
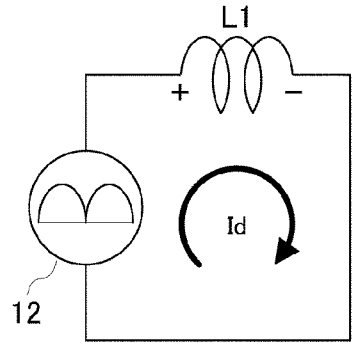
FIG. 5B  TIME t5 TO TIME t6
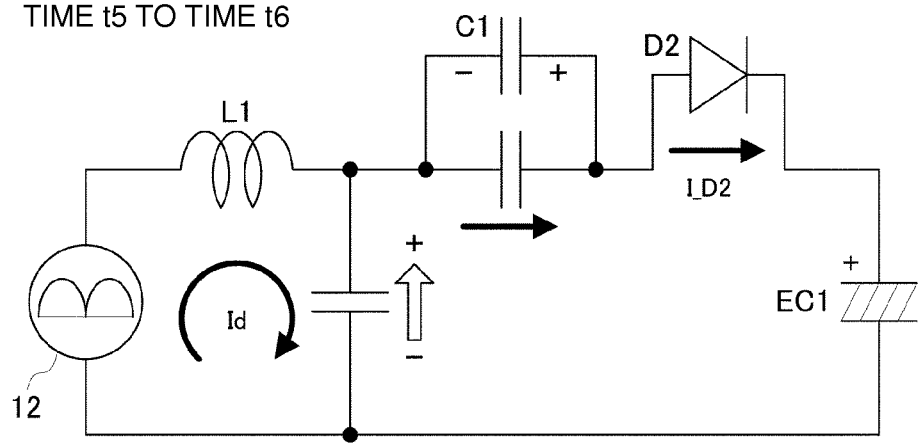
FIG. 5C  TIME t6 TO TIME t7
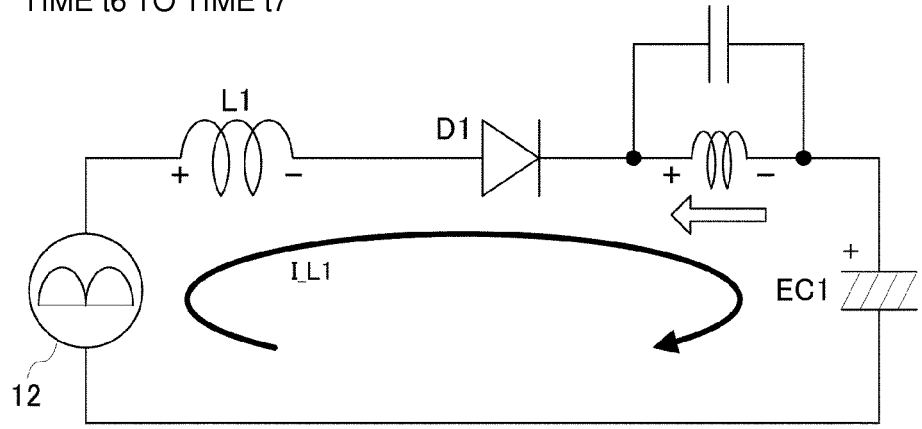

TIME t7 TO TIME t8

SWITCHING POWER SUPPLY APPARATUS

BACKGROUND OF THE INVENTION

1. Field of the Invention

The present invention relates to a switching power supply apparatus, and more specifically, to a switching power supply apparatus including a switching element that intermittently switches conduction of current on/off.

2. Description of the Related Art

An example of this type of apparatus is disclosed in Japanese Unexamined Patent Application Publication No. 61-280769. According to this related art, an inductor is connected in series with a diode, and a CR snubber circuit is connected in parallel with the inductor and the diode. A reverse recovery current during the reverse recovery time of the diode is reduced by the inductor that is connected in series with the diode, thereby suppressing noise.

However, in the related art, power loss in a resistor of the CR snubber circuit is large, which limits the power conversion performance.

SUMMARY OF THE INVENTION

Preferred embodiments of the present invention provide a switching power supply apparatus with improved power conversion performance.

According to a preferred embodiment of the present invention, a switching power supply apparatus includes a switching element that is turned on/off to intermittently conduct current input via a first inductor, a conduction path that supplies current input via the first inductor during a period in which the switching element is turned off, to a load, a first rectifying element that is provided in the conduction path that supplies current to the load, a second inductor that is provided in the conduction path so as to be connected in series with the first rectifying element, and a second rectifying element that has a reverse recovery time that is shorter than a reverse recovery time of the first rectifying element, the second rectifying element being connected in parallel with the second inductor that supplies current to the load.

The first rectifying element may preferably have breakdown voltage characteristics higher than breakdown voltage characteristics of the second rectifying element.

The switching power supply apparatus may preferably further include a capacitive impedance that is connected in parallel with the first rectifying element.

The second rectifying element may preferably be provided on an output side of the first rectifying element.

The capacitive impedance may preferably include a capacitor and a third inductor that are connected in series with each other.

A ferrite or an amorphous may preferably be used as a material of the second inductor or the third inductor.

A ferrite bead or an amorphous bead may preferably be used as the second inductor or the third inductor.

A FET may preferably be used as the first rectifying element.

The reverse recovery time of the second rectifying element may preferably be much shorter than the reverse recovery time of the first rectifying element, and practically does not need to be considered. When the second rectifying element becomes non-conducting, the peak value of reverse current that flows during the reverse recovery time of the first rectifying element is decreased or prevented by the second inductor. As a result, power loss due to reverse current is prevented, and power conversion efficiency is improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a diagram illustrating an example of flow of current during an interval of time from time t1 to t2.

FIG. 4B is a diagram illustrating an example of flow of current during an interval of time from time t2 to t3.

FIG. 4C is a diagram illustrating an example of flow of current during an interval of time from time t3 to t4.

FIG. 5A is a diagram illustrating an example of flow of current during an interval of time from time t4 to t5.

FIG. 5B is a diagram illustrating an example of flow of current during an interval of time from time t5 to t6.

FIG. 5C is a diagram illustrating an example of flow of current during an interval of time from time t6 to t7.

DETAILED DESCRIPTION OF THE PREFERRED EMBODIMENTS

Figure 1:
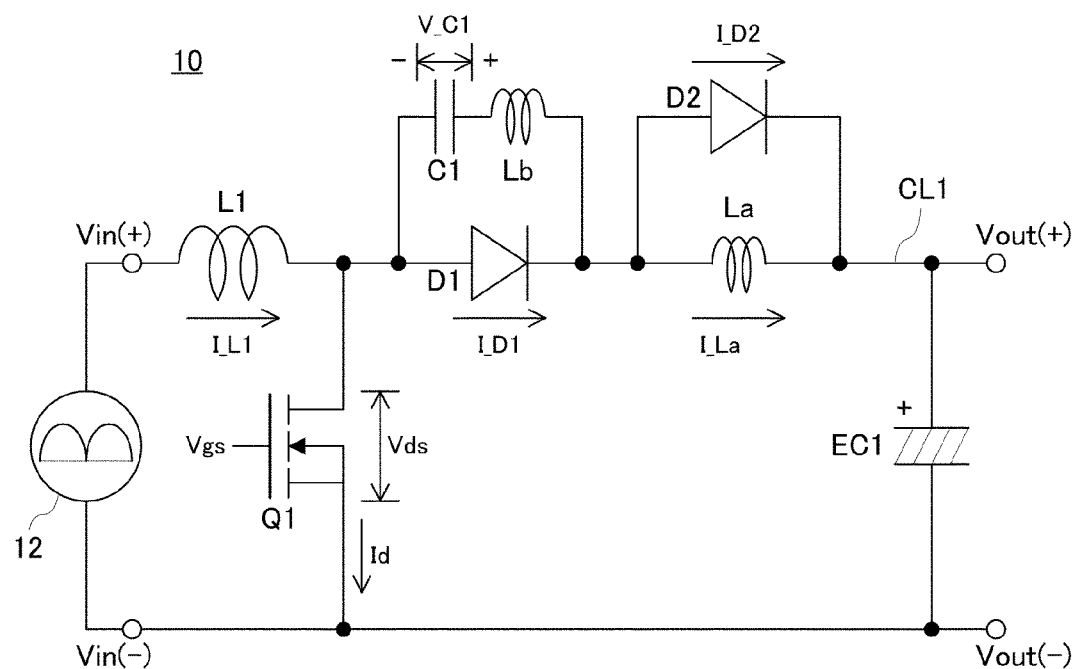
FIG. 1 is a circuit diagram illustrating a switching power supply apparatus according to a preferred embodiment of the present invention.

Referring to FIG. 1, a switching power supply apparatus 10 according to a preferred embodiment of the present invention includes an input terminal Vin(+) on the positive side and an input terminal Vin(−) on the negative side to which a power supply 12 is connected. The power supply 12 corresponds to a power supply that outputs a voltage obtained by performing full-wave rectifying an alternating-current voltage. The voltage is applied to the input terminals Vin(+) and Vin(−).

The input terminal Vin(+) is connected to one end of an electrolytic capacitor EC1 and an output terminal Vout(+) on the positive side, via an inductor L1, a rectifier diode D1 as a rectifying element, and an inductor La that are connected in series with one another. The input terminal Vin(−) is connected to the other end of the electrolytic capacitor EC1 and an output terminal Vout(−) on the negative side. A path connecting the input terminal Vin(+) and the output terminal Vout(+) is specifically defined as "conduction path CL1". The rectifier diode D1 is provided in the conduction path CL1 and arranged such that the anode is connected to the inductor L1 and the cathode is connected to the inductor La, that is, in an orientation facing towards the electrolytic capacitor EC1.

A capacitor C1 and an inductor Lb connected in series with each other are connected in parallel with the rectifier diode D1. More specifically, the capacitor C1 is arranged on the anode side of the rectifier diode D1, and the inductor Lb is arranged on the cathode side of the rectifier diode D1. A ferrite or an amorphous, for example, is preferably used as the material of the inductor La or Lb.

A high speed diode D2 as a rectifying element is connected in parallel with the inductor La. The high speed diode D2 is arranged to face in the same direction as the direction of the rectifier diode D1, that is, in an orientation facing towards the electrolytic capacitor EC1. The reverse recovery time of the high speed diode D2 is preferably much shorter than the reverse recovery time of the rectifier diode D1, and practically does not need to be considered. The breakdown voltage characteristics of the rectifier diode D1 are preferably higher than the breakdown voltage characteristics of the high speed diode D2. That is, the rectifier diode D1 preferably has a higher breakdown voltage than the high speed diode D2.

Figure 2:
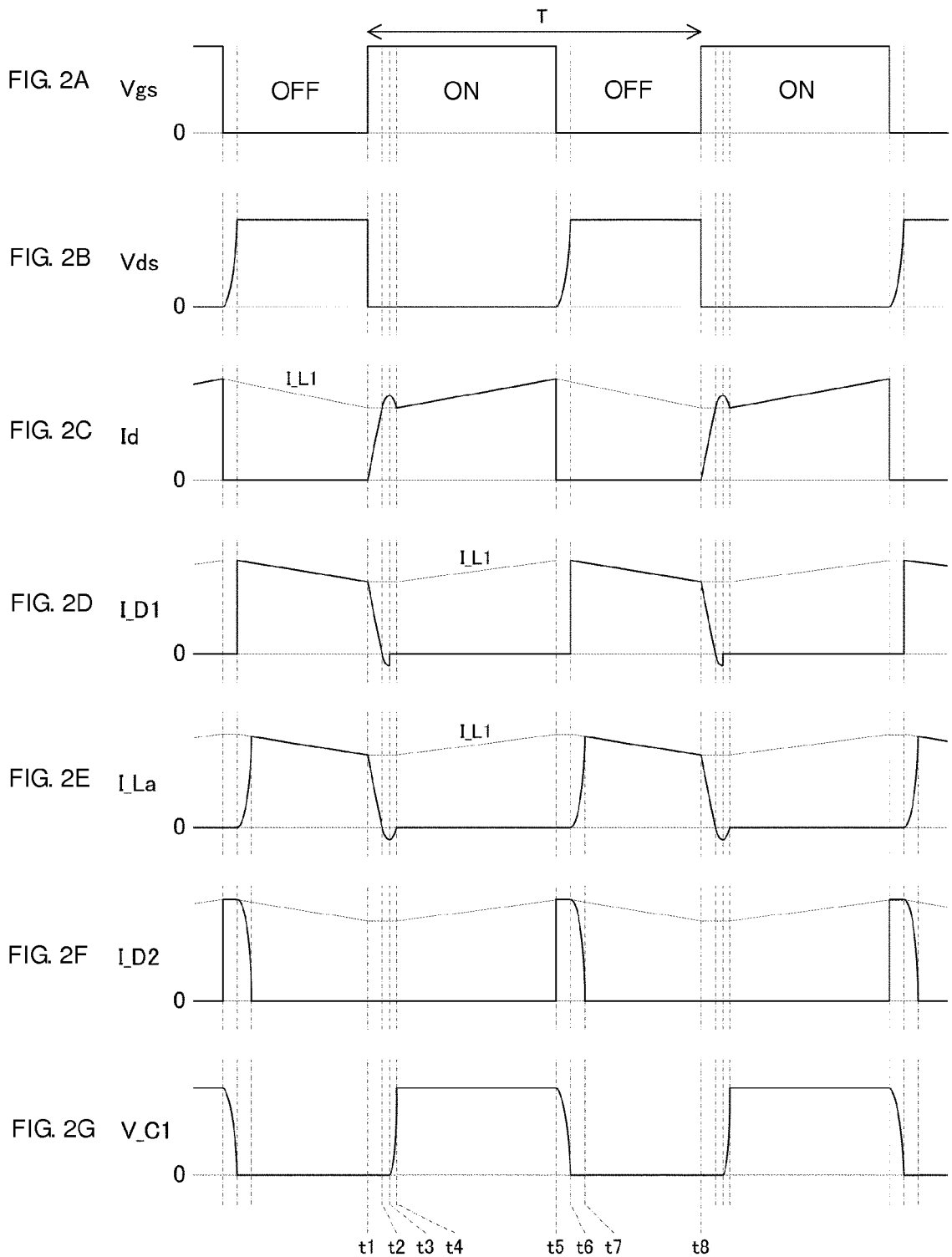
FIG. 2A illustrates an example of variations of a gate-source voltage of a switching element.
FIG. 2B is a waveform diagram illustrating an example of variations of a drain-source voltage of the switching element.
FIG. 2C is a waveform diagram illustrating an example of variations of a drain current conducted through the switching element.
FIG. 2D is a waveform diagram illustrating an example of variations of current conducted through a rectifier diode.
FIG. 2E is a waveform diagram illustrating an example of variations of current conducted through an inductor.
FIG. 2F is a waveform diagram illustrating an example of variations of current conducted through a high speed diode.
FIG. 2G is a waveform diagram illustrating an example of variations of a terminal voltage of a capacitor.

A switching element Q1 is connected between the anode of the rectifier diode D1 and the input terminal Vin(−). Specifically, the switching element Q1 is preferably a FET, whose drain is connected to the anode of the rectifier diode D1 and whose source is connected to the input terminal Vin(−). The switching element Q1 is turned on/off as illustrated in FIG. 2A, with an interval of time T as one switching period. With reference to each of times t1 to t7 of the interval of time T, the switching power supply apparatus 10 operates as described below.

(1) Time t1 to t2

The switching element Q1 is turned on at time t1. As illustrated in FIG. 2B, a drain-source voltage Vds of the switching element Q1 rapidly drops to 0 V. As illustrated in FIG. 2C, a drain current Id that is conducted through the switching element Q1 increases while being suppressed by the inductor La. Further, as illustrated in FIGS. 2D and 2E, currents I_D1 and I_La that are respectively conducted through the diode D1 and the inductor La each decrease with a large slope, and drop to 0 A at time t2. That is, during the interval of time from time t1 to t2, the drain current Id, and the currents I_D1 and I_La flow in the manner as illustrated in FIG. 4A.

(2) Time t2 to t3

The interval of time from time t2 to t3 corresponds to a storage time during the reverse recovery time of the diode D1. As illustrated in FIGS. 2D and 2E, the currents I_La and I_D1 flow in reverse through the inductor La and the diode D1. The drain current Id that is conducted through the switching element Q1 continues to increase as illustrated in FIG. 2C while being suppressed by the inductor La. That is, during the interval of time from time t2 to t3, the drain current Id, and the currents I_D1 and I_La flow in the manner as illustrated in FIG. 4B. The storage time during the reverse recovery time of the diode D1 ends at time t3.

Figure 3:
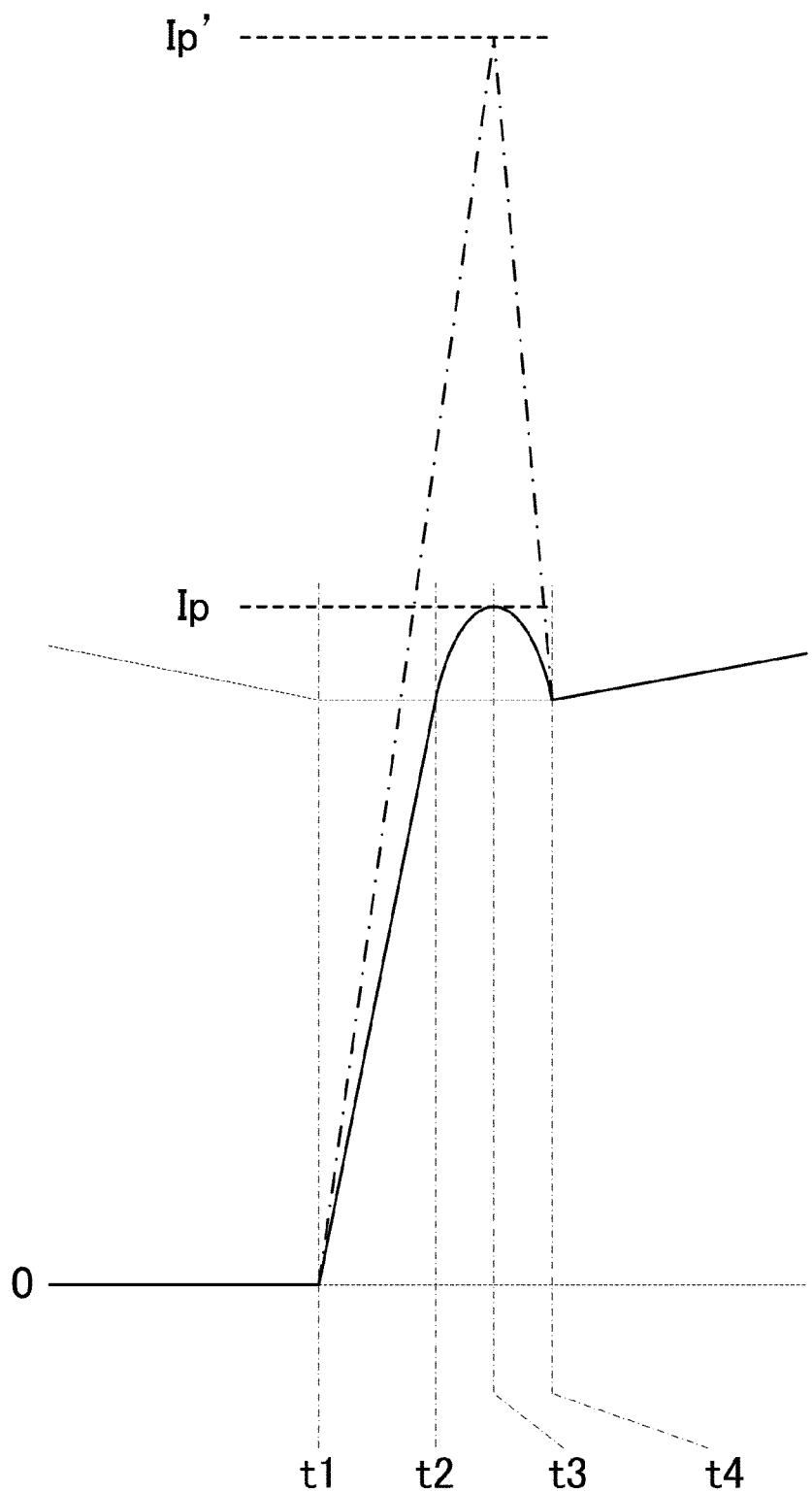
FIG. 3 is a waveform diagram illustrating a portion of variations of current conducted through the switching element during an interval of time from time t1 to t4.

If there is no inductor La, the current I_D1 that flows in reverse through the diode D1 increases sharply, and the peak value of the drain current Id that is conducted through the switching element Q1 increases to Ip' (see FIG. 3). However, by providing the inductor La as in the present preferred embodiment, the peak value of the drain current Id is suppressed to Ip.

(3) Time t3 to t4

The interval of time from t3 to t4 corresponds to a transition time during the reverse recovery time of the diode D1. During this interval of time, the current I_La flows in reverse through the inductor La as illustrated in FIG. 2E. The capacitor C1 is charged by the current I_La that flows in reverse through the inductor La, and a voltage V_C1 that is generated across the terminals of the capacitor C1 increases as illustrated in FIG. 2G. The energy of the current through the inductor La is converted into electrostatic energy of the capacitor C1 in this manner. The current I_La that flows in reverse through the inductor La returns to 0 A at time t4. That is, during the interval of time from t3 to t4, the drain current Id and the current I_La flow in the manner as illustrated in FIG. 4C.

(4) Time t4 to t5

The switching element Q1 is ON, and a current I_L1 through the inductor L1 increases. Thus, current energy is stored in the inductor L1. The switching element Q1 is turned off at time t5. The drain current Id flows in the manner as illustrated in FIG. 5A.

(5) Time t5 to t6

Charge is stored in a parasitic capacitance generated across the terminals of the switching element Q1, and the drain-source voltage Vds increases as illustrated in FIG. 2B. As illustrated in FIG. 2B, the drain current Id that is conducted through the switching element Q1 sharply drops to 0 A. The charge stored in the capacitor C1 is discharged through the diode D2 (see FIG. 2F), and the voltage V_C1 across the terminals of the capacitor C1 drops as illustrated in FIG. 2G. Moreover, as illustrated in FIG. 2D, the diode D1 transitions to a conducting state at time t6. During the interval of time from time t5 to t6, the drain current Id and a current I_D2 flow in the manner as illustrated in FIG. 5B.

Since the drain current Id illustrated in FIG. 5B is to store charge in the parasitic capacitance of the switching element Q1, and the drain current Id flows for only a short interval of time, variation of the drain current Id during this interval of time do not occur in the current waveform illustrated in FIG. 2C.

(6) Time t6 to t7

The current I_La that flows through the inductor La increases rapidly as illustrated in FIG. 2E, and the current I_D2 that flows through the diode D2 decreases rapidly as illustrated in FIG. 2F. The current I_D2 drops to 0 A at time t7. During the interval of time from time t6 to t7, the current I_L1 based on the current energy stored in the inductor L1 during the interval of time from time t4 to t5 flows through the diode D1, the inductor La, and the diode D2 as illustrated in FIG. 5C.

(7) Time t7 to t8

Figure 6:
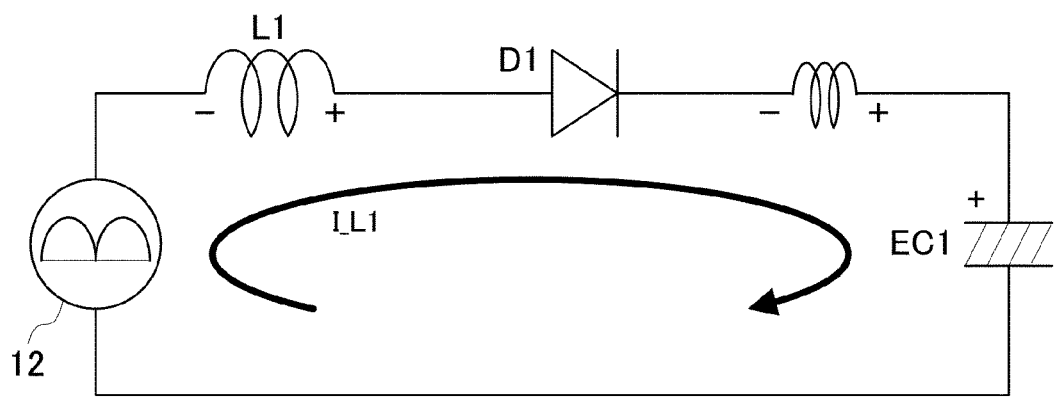
FIG. 6 is a diagram illustrating an example of flow of current during an interval of time from time t7 to t8.

The current I_L1 output from the inductor L1 is supplied to the electrolytic capacitor EC1 via the diode D1 and the inductor La. As illustrated in FIG. 2E, the currents I_L1 and I_La that respectively flow through the inductors L1 and La decrease gradually with the supply of these currents. The switching element Q1 is turned on again at time t8. From t7 to t8, the drain current Id and the currents I_D1 and I_La flow in the manner as illustrated in FIG. 6.

As can be understood from the foregoing description, the switching element Q1 is turned on/off to intermittently conduct current that is input via the inductor L1. The current that is input during a period in which the switching element Q1 is turned off is supplied to the electrolytic capacitor EC1 via the conduction path CL1. The rectifier diode D1 is arranged in the conduction path CL1 so as to face towards the electrolytic capacitor EC1. The inductor La is provided in the conduction path CL1 so as to be connected in series with the rectifier diode D1. The high speed diode D2 has a reverse recovery time that is shorter than the reverse recovery time of the rectifier diode D1, and is connected in parallel with the inductor La so as to face towards the electrolytic capacitor EC1.

The reverse recovery time of the high speed diode D2 is shorter than the reverse recovery time of the rectifier diode D1. When the reverse recovery time of the high speed diode D2 ends, the peak value of reverse current that flows during the subsequent reverse recovery time of the rectifier diode D1 is suppressed by the inductor La. As a result, loss due to reverse current is prevented, and power conversion efficiency is improved.

Figure 7:
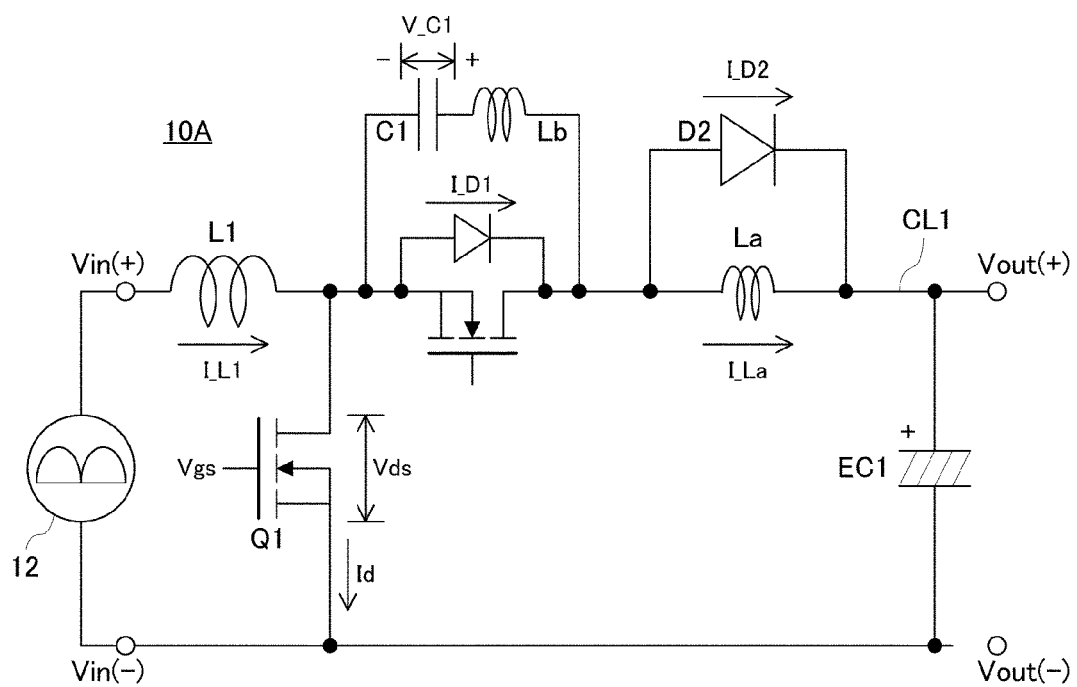
FIG. 7 is a circuit diagram illustrating a configuration according to another preferred embodiment of the present invention.

While in the present preferred embodiment, the rectifier diode D1 is preferably used as a rectifying element, as illustrated in a switching power supply apparatus 10A in FIG. 7, a synchronous rectification scheme using a FET having a parasitic diode (body diode,) instead of the rectifier diode D1, may be used.

While in the present preferred embodiment, the inductor Lb is preferably connected in series with the capacitor C1, the inductor Lb may be omitted. As the capacitor C1, a parasitic capacitance parasitically generated in the rectifier diode D1 that is a rectifying element or a FET may be used.

The power supply connected to the switching power supply apparatus may be a power supply that outputs direct-current voltage.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A switching power supply apparatus comprising:
    a switching element that is turned on/off to intermittently conduct current input via a first inductor;
    a conduction path that supplies current input via the first inductor to a load during a period in which the switching element is turned off;
    a first rectifying element provided in the conduction path and supplying current to the load;
    a second inductor provided in the conduction path and connected in series with the first rectifying element; and
    a second rectifying element having a reverse recovery time shorter than a reverse recovery time of the first rectifying element, the second rectifying element being connected in parallel with the second inductor that supplies current to the load; wherein
    during a rectification operation of the first rectifying element, the reverse recovery time of the second rectifying element ends, and when the switching element turns on, current loss due to reverse current of the first rectifying element is prevented by the second inductor; and
    reverse voltage generated during an on period of the switching element is applied to the first rectifying element and not to the second rectifying element.

2. The switching power supply apparatus according to claim 1, wherein the first rectifying element has breakdown voltage characteristics higher than breakdown voltage characteristics of the second rectifying element.

3. The switching power supply apparatus according to claim 1, further comprising a capacitive impedance that is connected in parallel with the first rectifying element.

4. The switching power supply apparatus according to claim 1, wherein the second rectifying element is provided on an output side of the first rectifying element.

5. The switching power supply apparatus according to claim 1, wherein the capacitive impedance includes a capacitor and a third inductor that are connected in series with each other.

6. The switching power supply apparatus according to claim 1, wherein at least one of the second inductor and the third inductor is made of a ferrite material or an amorphous material.

7. The switching power supply apparatus according to claim 1, wherein the first rectifying element is a FET.

8. The switching power supply apparatus according to claim 1, wherein the first rectifying element is a diode.

9. The switching power supply apparatus according to claim 1, wherein the second rectifying element is a high speed diode.

10. The switching power supply apparatus according to claim 1, wherein the first rectifying element and the second rectifying element are respectively defined by first and second diodes arranged to face in the same direction.

11. The switching power supply apparatus according to claim 1, wherein the switching element is a FET.

12. The switching power supply apparatus according to claim 1, further comprising an electrolytic capacitor connected between the second inductor and the switching element.

13. The switching power supply apparatus according to claim 6, wherein at least one of the second inductor and the third inductor is defined by a ferrite bead or an amorphous bead.

14. The switching power supply apparatus according to claim 12, wherein
    the first rectifying element and the second rectifying element are respectively defined by first and second diodes; and
    each of the first and second diodes are arranged to face the electrolytic capacitor.

* * * * *